US012039337B2

United States Patent
Cohen et al.

(10) Patent No.: US 12,039,337 B2
(45) Date of Patent: Jul. 16, 2024

(54) PROCESSOR WITH MULTIPLE FETCH AND DECODE PIPELINES

(71) Applicant: ADVANCED MICRO DEVICES, INC., Santa Clara, CA (US)

(72) Inventors: Robert B. Cohen, Austin, TX (US); Tzu-Wei Lin, Austin, TX (US); Anthony J. Bybell, Austin, TX (US); Bill Kai Chiu Kwan, Austin, TX (US); Frank C. Galloway, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 34 days.

(21) Appl. No.: 17/032,494

(22) Filed: Sep. 25, 2020

(65) Prior Publication Data
US 2022/0100519 A1    Mar. 31, 2022

(51) Int. Cl.
*G06F 9/38*    (2018.01)
*G06F 9/30*    (2018.01)

(52) U.S. Cl.
CPC ........ *G06F 9/3804* (2013.01); *G06F 9/30058* (2013.01); *G06F 9/3822* (2013.01); *G06F 9/3867* (2013.01)

(58) Field of Classification Search
CPC ..... G06F 9/3804; G06F 9/3822; G06F 9/3867
See application file for complete search history.

(56) References Cited

U.S. PATENT DOCUMENTS

| | | | |
|---|---|---|---|
| 5,913,049 A * | 6/1999 | Shiell | G06F 9/3012 |
| | | | 712/215 |
| 6,079,014 A | 6/2000 | Papworth et al. | |
| 9,612,844 B2 * | 4/2017 | Webber | G06F 9/3009 |
| 10,628,163 B2 * | 4/2020 | Wiencke | G06F 9/3804 |
| 2002/0049892 A1 | 4/2002 | Saulsbury et al. | |
| 2004/0015888 A1 * | 1/2004 | Fujii | G06F 8/4441 |
| | | | 717/136 |
| 2008/0148089 A1 | 6/2008 | Luick | |
| 2009/0024836 A1 | 1/2009 | Shen et al. | |
| 2009/0235051 A1 | 9/2009 | Codrescu et al. | |

(Continued)

OTHER PUBLICATIONS

Paramjit S. Oberoi and Gurindar S. Sohi. "Parallelism in the Front-End" ISCA '03: Proceedings of the 30th annual international symposium on Computer architecture Jun. 2003 pp. 230-240 (Year: 2003).*

(Continued)

*Primary Examiner* — Jacob Petranek (57) ABSTRACT

A processor employs a plurality of fetch and decode pipelines by dividing an instruction stream into instruction blocks with identified boundaries. The processor includes a branch predictor that generates branch predictions. Each branch prediction corresponds to a branch instruction and includes a prediction that the corresponding branch is to be taken or not taken. In addition, each branch prediction identifies both an end of the current branch prediction window and the start of another branch prediction window. Using these known boundaries, the processor provides different sequential fetch streams to different ones of the plurality of fetch and decode states, which concurrently process the instructions of the different fetch streams, thereby improving overall instruction throughput at the processor.

20 Claims, 4 Drawing Sheets

(56) References Cited

U.S. PATENT DOCUMENTS

| | | | |
|---|---|---|---|
| 2011/0264862 A1* | 10/2011 | Karlsson | G06F 9/3842 711/125 |
| 2013/0191825 A1* | 7/2013 | Muff | G06F 9/3851 718/1 |
| 2015/0100763 A1* | 4/2015 | Holm | G06F 9/3017 712/210 |
| 2019/0079771 A1* | 3/2019 | Jung | G06F 9/381 |

OTHER PUBLICATIONS

Paramjit Oberoi and Gurindar Sohi. "Out-of-Order Instruction Fetch using Multiple Sequencers" Proceedings of the International Conference on Parallel Processing (ICPP'02) (Year: 2002).*

International Search Report and Written Opinion mailed Jan. 5, 2022 for PCT/US2021/051045, 10 pages.

International Preliminary Report on Patentability issued in Application No. PCT/US2021/051045, mailed Apr. 6, 2023, 7 pages.

* cited by examiner

PROCESSOR WITH MULTIPLE FETCH AND DECODE PIPELINES

BACKGROUND

To improve efficiency and instruction throughput, a modern processor typically supports instruction processing parallelism, wherein the processor concurrently performs, during a given processor cycle, specified processing tasks for different instructions of a received instruction stream. For example, many processors employ multiple execution units that concurrently execute operations for different instructions, thereby reducing the overall time required to execute the different instructions. However, implementing parallelism at the fetch and decode units of a processor presents additional challenges. Some processors employ decode units that decode multiple instructions concurrently, but circuit area and power considerations limit the size and efficiency of these decode units.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

For parallel fetch and decode pipelines of a processor to correctly process different blocks of instructions, the processor must correctly identify the boundaries (beginning and end) of each instruction block. Failure to identify these boundaries would cause a fetch and decode pipeline, in some cases, to execute a fetch at an address that is not aligned with the start of an instruction, resulting in processing errors and negatively impacting processing efficiency. Furthermore, some processors implement variable-length instruction sets, wherein the size of different instructions executed by the processor can vary, and the length of any particular instruction is typically unknown to the fetch unit at the time the instruction is fetched. The length of each instruction is dynamically determined by the fetch and decode units, allowing the fetch unit to identify the correct address for the next instruction to be fetched. Because of the variable instruction length, it is typically difficult to identify the boundaries for a given block of instructions in advance of fetching and decoding each instruction in the instruction block.

FIGS. 1-6 illustrate techniques for a processor employing a plurality of fetch and decode pipelines by dividing an instruction stream into instruction blocks (sometimes referred to as fetch streams) with identified boundaries. For example, in some embodiments the processor includes a branch predictor that generates branch predictions. Each branch prediction corresponds to a branch instruction and includes a prediction that the corresponding branch is to be taken or not taken. In addition, each branch prediction identifies both an end of the current branch prediction window and the start of another branch prediction window (e.g., the branch target for a predicted "taken" branch or the byte address immediately following the branch instruction for a "not taken" branch). Thus, predicted branches provide known addresses of end and start blocks of sequentially ordered instructions (referred to herein as sequential fetch streams). Using these known boundaries, the processor provides different sequential fetch streams to different ones of the plurality of fetch and decode states, which concurrently process (fetch and decode) the instructions of the different fetch streams, thereby improving overall instruction throughput at the processor.

In some embodiments, the processor selects the fetch and decode pipeline to process a given fetch stream based at least in part on specified instruction flow criteria that govern one or more aspects of instruction flow through the processor. To illustrate, in some embodiments each fetch and decode pipeline of the processor includes an input queue to store instructions to be processed, and the instruction flow criteria identifies aspects of the input queues that govern which of the fetch and decode pipelines is to be selected to process the given fetch stream. For example, in some embodiments the instruction flow criteria mandates that the processor select the fetch and decode unit associated with the input queue having fewer instructions to process, thereby balancing the instruction load between the different fetch and decode pipelines. In other embodiments, the instruction flow criteria mandates that a minimum or maximum number of instruction bytes be provided to one of the fetch and decode pipelines before instruction bytes are provided to another of the fetch and decode pipelines. In still other embodiments, the instruction flow criteria mandates that fetch streams associated with different threads be provided to different ones of the fetch and decode pipelines.

In some embodiments, instead of or in addition to identifying fetch streams based on branch predictions, the processor employs an instruction map that identifies the boundaries for different instruction blocks; that is, each entry of the instruction map identifies the memory address associated with the start of fetch stream and a memory address associated with the end of fetch stream. The processor employs the memory map to divide an instruction stream into fetch streams, and selects one of the plurality of fetch and decode pipelines to process each fetch stream.

In some cases, the concurrent processing of different fetch streams results in the fetch and decode pipelines fetching and decoding instruction bytes out of order relative to an overall program flow. Accordingly, in some embodiments the processor includes a reorder control module to reorder decoded instruction bytes from the different fetch and decode pipelines, thereby restoring the program flow prior to the decoded instruction bytes being provided to subsequent units of an instruction pipeline.

Figure 1:
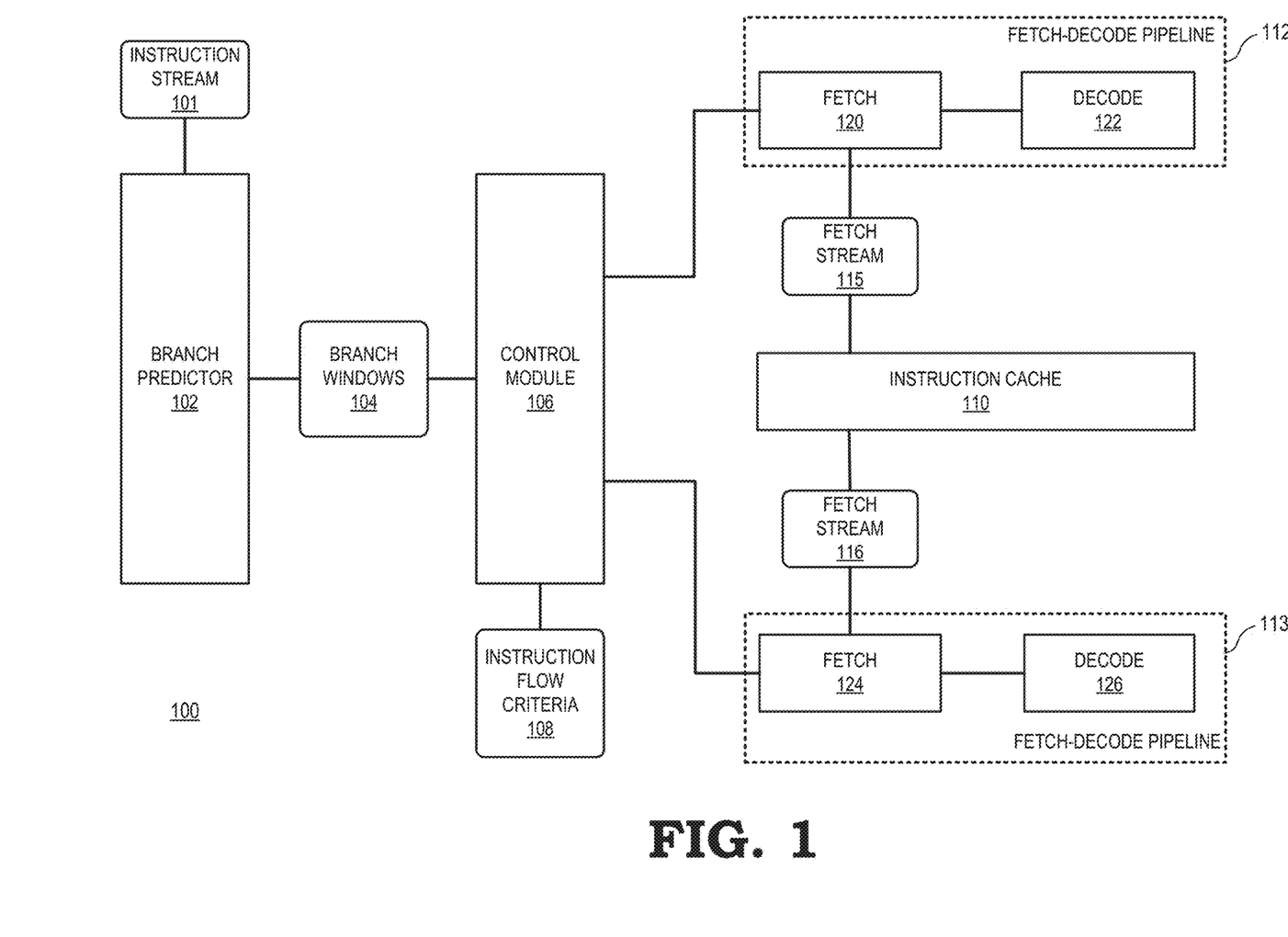
FIG. 1 is a block diagram of a processor employing a plurality of fetch and decode pipelines that concurrently process blocks of instructions indicated by a branch predictor in accordance with some embodiments.

Turning to the Figures, FIG. 1 illustrates a processor 100 that implements multiple fetch and decode pipelines in accordance with some embodiments. The processor 100 is generally configured to execute sets of instructions (e.g., computer programs) to carry out specified tasks on behalf of an electronic device. Accordingly, in different embodiments the processor 100 is part of one of a variety of electronic devices, such as a desktop computer, laptop computer, server, smartphone, tablet, game console, and the like. It is assumed for purposes of discussion that the processor 100 is a general-purpose processor, such as a central processing unit (CPU). However, in other embodiments the processor 100 is another type of processor, such as a processing unit specially designed to perform operations of a specified type, such as a graphics processing unit (GPU), machine learning processor, and the like.

In the example of FIG. 1, the sets of instructions executed by the processor 100 are represented as instruction stream 101. In particular, the instruction stream 101 is the stream of instructions executed by the processor 100 over a given period of time, and the instructions are therefore associated with one or more computer programs, program threads, and the like. The instruction stream 101 is composed of variable length instructions. That is, the size of one instruction (e.g., the size of the op code and operands associated with the instruction) of the instruction stream 101 is different than the size of at least one other instruction of the instruction stream 101.

To support execution of instructions of the instruction stream 101, the processor 100 includes a plurality of fetch and decode pipelines, including fetch and decode pipelines 112 and 113. It will be appreciated that in some embodiments the processor 100 includes additional fetch and decode pipelines not illustrated at FIG. 1. Each fetch and decode pipeline is configured to fetch instructions from an instruction cache 110 and to decode each fetched instruction into one or more operations. For example, in the depicted embodiment of FIG. 1, the fetch and decode pipeline 112 includes a fetch unit 120 configured to fetch instruction bytes from the instruction cache 110 and a decode unit 122 to decode the fetched instruction bytes into one or more operations. Similarly, the fetch and decode pipeline 113 includes a fetch unit 124 configured to fetch instruction bytes from the instruction cache 110 and a decode unit 126 to decode the fetched instruction bytes into one or more operations. The processor 100 includes additional instruction pipeline units, not illustrated at FIG. 1, to execute the decoded instruction bytes, such as a plurality of execution units to execute each operation of the decoded instructions.

The processor 100 is generally configured, as described further herein, to divide the instruction stream 101 into separate fetch streams, and to provide each fetch stream to one of the fetch and decode pipelines 112 and 113. The processor 100 designates a memory address associated with an initial instruction of the fetch stream, and further designates an end of the fetch stream. In some cases, the end of the fetch stream corresponds to the end of a cache line of the instruction cache 110 that includes the initial instruction. In other embodiments the end of fetch stream corresponds to a defined instruction, such as a branch instruction as described further herein.

To fetch and decode instruction bytes of a fetch stream, the fetch unit of the fetch and decode pipeline fetches blocks of instructions, referred to as fetch windows, from the instruction cache 110 and provides the fetched instruction bytes to the corresponding decode unit, which decodes the fetched instruction bytes and also determines the size of the corresponding fetched instructions. The fetch and decode pipeline then proceeds to fetch and decode the next fetch window of the fetch stream. It will be appreciated that although in the illustrated embodiment, each fetch and decode pipeline includes a separate fetch unit, in other embodiments a fetch unit is shared between multiple fetch and decode pipelines, while in yet other embodiments a decode unit is shared between multiple fetch and decode pipelines.

As noted above, the instruction stream 101 includes variable length instructions, and these variable lengths prevent the processor 100 from dividing the instruction stream 101 into regularly sized fetch streams. Accordingly, to determine the initial and end instruction for each fetch stream, the processor 100 employs branch windows 104 identified by a branch predictor 102. To illustrate, the branch predictor 102 is a set of buffers and associated control circuitry that monitors the instruction stream 101 for branch patterns (that is, patterns associated with which branch instructions of the instruction stream 101 are taken or not taken, and under what conditions). Based on the patterns the branch predictor 102 generates branch predictions indicating the expected outcome of branch instructions of the instruction stream 101. In some embodiments, the branch predictor 102 provides any of three different prediction types: 1) a branch taken prediction, representing a prediction that a branch instruction results in the corresponding branch being taken 2) a branch not taken prediction, representing a prediction that a branch instruction results in the corresponding branch not being taken and 3) no prediction representing an indication that the branch predictor has not identified the next branch instruction of the instruction stream 101, and that the instruction flow of the processor 100 should proceed sequentially.

For each branch prediction, the branch predictor 102 identifies a block of instructions, referred to as a branch window, associated with the branch wherein each branch window includes 1) a designator (e.g., a pointer) of an initial instruction byte of the window; and 2) a designator of a final instruction byte of the window. Each branch window 104 thus defines a sequence of instruction bytes between the initial instruction and the final instruction of the window. For example, in some embodiments the branch predictor 102 identifies, for each branch, a branch target address that indicates the memory address of the initial instruction associated with the predicted branch outcome. The branch target address therefore identifies the initial instruction of a branch window. In some embodiments, the branch predictor 102 also identifies the memory address of the last instruction for at least some branch prediction windows. For example, in some embodiments, the last instruction of a branch prediction window is the end byte of the next predicted branch for the instruction stream 101. The next branch prediction window will start at the target address of the predicted branch, and will end at either the end byte of the next predicted branch or, the end of the corresponding cache line of the instruction cache 110.

Thus, at least some of the branch windows 104, referred to as defined branch windows, represent a corresponding sequence of instructions having a well-defined beginning and a well-defined ending. For these defined branch windows, the processor 100 is able to safely assign different corresponding fetch streams to different ones of the fetch and decode pipelines 112 and 113. To support assignment of fetch streams for defined branch windows, the processor 100 includes a control module 106 that receives branch windows 104 from the branch predictor 102. For each of the branch windows 104, the control module 106 selects one of the fetch and decode pipelines 112 and 113 and provides the corresponding fetch stream to the selected fetch and decode pipeline, which fetches the sequence of instruction bytes of the branch window and decodes the fetched instruction bytes.

Because the defined branch windows are blocks of instruction bytes having well-defined beginnings that are aligned with the start of an instruction, the fetch and decode pipelines 112 and 113 are able to concurrently fetch and decode instruction bytes for different corresponding fetch streams in parallel, thereby improving overall instruction throughput at the processor 100. For example, in the depicted embodiment, the fetch and decode pipeline 112 fetches and decodes instruction bytes of a fetch stream 115, while the fetch and decode pipeline 113 concurrently fetches and decodes instruction bytes of a fetch stream 116.

In some embodiments, to select the fetch and decode pipeline for each fetch stream, the control module 106 employs instruction flow criteria 108 that define a selection policy for the processor 100. The instruction flow criteria 108 is a data structure that is stored in a memory or other storage component (not shown) of the processor 100, and in some embodiments is generated, for example, during testing and development of the processor 100 to ensure efficient processor operation. In other embodiments, the instruction flow criteria is generated by an operating system executing at the processor 100, and is adjustable or programmable by a user of the electronic device that incorporates the processor 100.

In some embodiments, the control module 106 implements an instruction flow policy based in part on fixed policy constraints to prevent execution errors at the processor 100 and in part on the criteria set forth by the instruction flow criteria 108. The control module first ensures that the fixed policy constraints are met. Once those constraints are satisfied, the control module 106 employs the instruction flow criteria to enhance instruction throughput at the processor 100.

To illustrate, in order to prevent execution errors at the processor 100, the control module 106 employs a fixed policy constraint that ensures that the start of any fetch stream directed to a fetch and decode pipeline has a known start address, as provided by the branch predictor 102 or another portion of the processor 100. The control module 106 also ensures that any subsequent fetch streams that did not have another branch target address identified (sequential fetch streams) were assigned in order to the same pipes.

For example, in some cases the branch windows 104 provided by the branch predictor 102 indicate only the start of a fetch stream, by providing the branch target address for a predicted branch. The end of the initial branch stream is indicated by the end of the cache line of the instruction cache 110 that includes the branch target address. Upon reaching the end of the cache line, the fetch and decode pipeline assigned to the branch window identifies the next instruction address in the instruction flow. In some embodiments, this next instruction address is indicated by the last instruction of the initial branch window. The next instruction address denotes the start of another fetch stream to be fetched and decoded. The control module 106 ensures that a sequence of instructions that includes multiple fetch streams are all assigned to the same fetch and decode pipeline, thereby preventing execution errors that could result from the sequence of instructions being divided among multiple fetch and decode pipelines.

As noted above, if the fixed policy constrains are satisfied, the control module 106 employs the instruction flow criteria 108 when assigning fetch streams to the fetch and decode pipelines. The instruction flow criteria 108 represent assignment rules that enhance instruction throughput at the processor 100. For example, in some embodiments, based on the instruction flow criteria 108, the control module 106 selects a fetch and decode pipeline to process a fetch stream based at least in part on the relative workload pending at each of the plurality of fetch and decode pipelines. To illustrate, in some embodiments each of the fetch and decode pipelines 112 and 113 includes one or more queues, such as an input queue, to store instructions, op codes, or other information. Based on the fullness of these one or more queues, the control module 106 determines the relative workload pending at each of the fetch and decode pipelines 112 and 113. In response to receiving a branch window from the branch predictor 102, and assuming that the fixed constraints are satisfied, the control module 106 assigns the corresponding fetch stream to the fetch and decode pipeline having the lower workload (i.e. the fetch and decode pipeline have less pending work).

In some embodiments, the configuration of the fetch and decode pipelines 112 and 113 is such that it is more efficient to assign a threshold number of fetch streams to one pipeline before assigning fetch windows to the other. Accordingly, in these embodiments, and based on the instruction flow criteria 108, the control module 106 selects one of the fetch and decode pipelines 112 and 113 to process fetch streams until the number of pending instruction bytes at the selected pipeline exceeds a threshold. The control module 106 then begins assigning fetch streams to the other of the fetch and decode pipelines 112 and 113.

In some embodiments, the fetch and decode pipelines 112 and 113 are configured such that processing efficiency is reduced once a threshold maximum number of fetch streams have been assigned to one pipeline. Accordingly, in these embodiments, and based on the instruction flow criteria 108, the control module 106 selects one of the fetch and decode pipelines 112 and 113 to process fetch streams until the threshold maximum number of pending instruction bytes at the selected pipeline is reached. The control module 106 then begins assigning fetch streams to the other of the fetch and decode pipelines 112 and 113.

In some embodiments, the fetch streams to be processed by the fetch and decode pipelines 112 and 113 are associated with different program threads executing at the processor 100. That is, the instruction bytes for one fetch stream are instruction bytes of one thread while the instruction bytes of another fetch streams are instruction bytes of another thread. In these embodiments, the control module 106 assigns fetch streams to the fetch and decode pipelines 112 and 113 based in part on the thread associated with each fetch stream. For example, in some embodiments each thread is associated with a quality of service (QoS) level set by an operating system executing at the processor 100. The control module 106 selects the fetch and decode pipeline to process a given branch window based on the QoS level of the thread associated with the given fetch stream, as well as the QoS level of threads associated with the fetch streams being processed at the fetch and decode pipelines 112 and 113. For example, in some embodiments the control module 106 assigns fetch streams to the fetch and decode pipelines 112 and 113 so that the fetch streams of a thread having a higher QoS are not blocked by the fetch streams of a thread having a lower QoS level, such as by assigning all fetch streams of a thread having the higher QoS to the fetch and decode pipeline 112 and assigning all fetch streams of threads having lower QoS levels to the fetch and decode pipeline 113.

Figure 2:
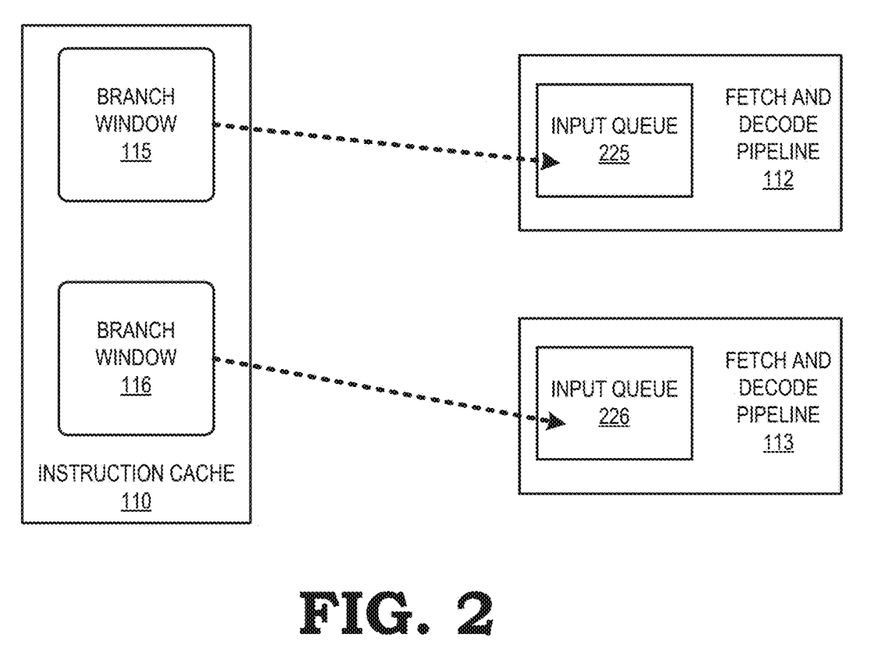
FIG. 2 is a block diagram illustrating an example of the processor of FIG. 1 providing different blocks of instructions to different ones of the plurality of fetch and decode pipelines in accordance with some embodiments.

FIG. 2 is a block diagram illustrating an example of the control module 106 assigning the fetch streams 115 and 116, based on the branch windows, to fetch and decode pipelines in accordance with some embodiments. In the depicted example, the branch predictor 102 has indicated the fetch streams 115 and 116 to the control module 106 by, for example, indicating a branch target address for each of the fetch streams 115 and 116. In response, the control module 106 selects the fetch and decode pipeline 112 to process the instructions for the fetch stream 115. Accordingly, the control module 106 provides the branch target address associated with the fetch stream 115 to the fetch unit 120, and in response the fetch unit 120 retrieves from the instruction cache 110 the sequence of instruction bytes indicated by the branch target address, and stores the retrieved instructions at an input queue 225. The decode unit 122 accesses the instructions stored at the input queue 225 and decodes each instruction into one or more operations for subsequent dispatch to one or more execution units of the processor 100.

In response to receiving the branch target address for the fetch stream 116, the control module 106 selects the fetch and decode pipeline 113 and provides the branch target address associated with the fetch stream 115 to the fetch unit 124. In response the fetch unit 124 retrieves from the instruction cache 110 the sequence of instruction bytes indicated by the branch target address and stores the retrieved instruction bytes at an input queue 226. The decode unit 124 accesses the instruction bytes stored at the input queue 226 and decodes the instruction bytes into one or more operations for subsequent dispatch to the one or more execution units of the processor 100. In some embodiments, at least some of the fetch and decode operations of the pipeline 113 with respect to the fetch stream 116 are concurrent with at least some of the fetch and decode operations of the pipeline 112 with respect to the fetch stream 115, thereby improving instruction throughput at the processor 100.

Figure 3:
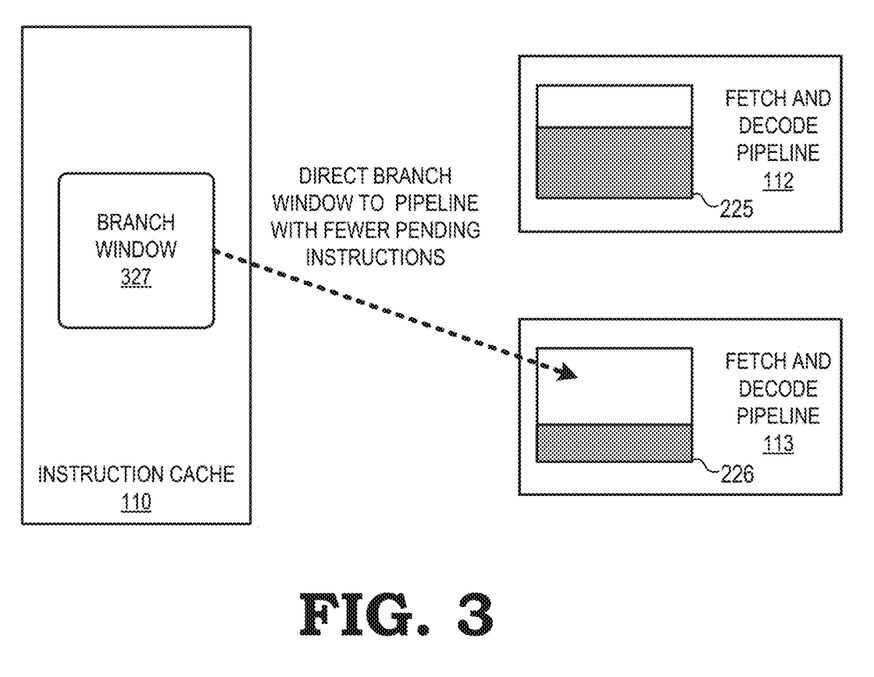
FIG. 3 is a block diagram illustrating an example of the processor of FIG. 1 selecting one of the plurality of fetch and decode pipelines to receive instructions based on a relative fullness of corresponding input queues in accordance with some embodiments.

As noted above, in some embodiments the instruction flow criteria 108 indicate that the control module 106 is to assign fetch streams to the fetch and decode pipelines 112 and 113 based on the relative workload at each pipeline. An example is illustrated at FIG. 3 in accordance with some embodiments. In the example of FIG. 3, the control module 106 monitors the fullness of the input queues 224 and 226 of the fetch and decode pipelines 112 and 113 respectively. In the depicted example, the input queue 225 is more full than the input queue 226. That is, the input queue 225 has more instruction bytes awaiting processing than does the input queue 226, indicating that the fetch and decode pipeline 112 has a greater overall workload than does the fetch and decode pipeline 113. Accordingly, in response to receiving from the branch predictor 102 an indicator of a fetch stream 327, the control module 106 selects the fetch and decode pipeline 113 to process the fetch stream 327. The control module 106 thereby balances the overall fetch and decode workload of the processor 100 between the fetch and decode pipelines 112 and 113.

Figure 4:
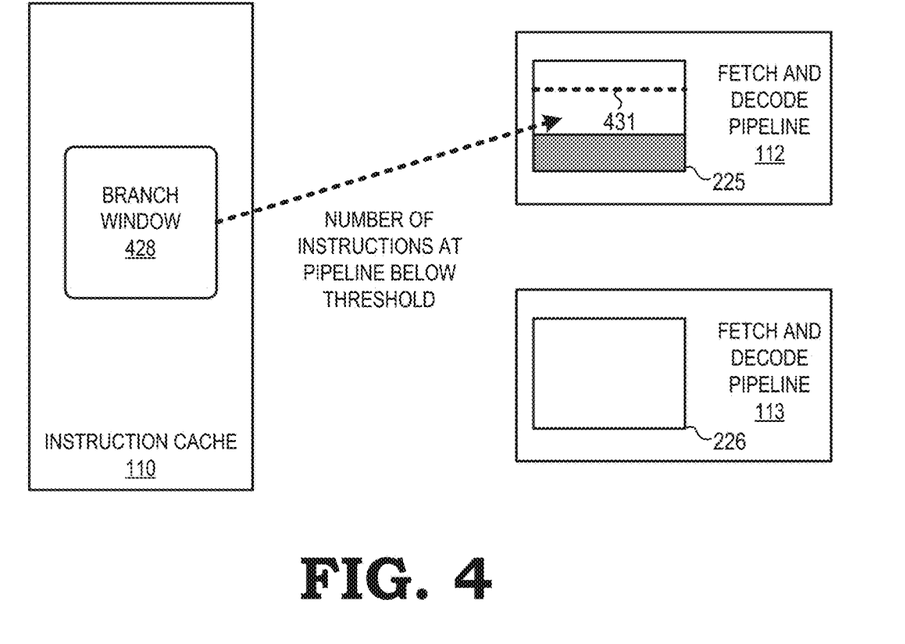
FIG. 4 is a block diagram illustrating an example of the processor of FIG. 1 selecting one of the plurality of fetch and decode pipelines to receive instructions based on the fullness of an input queue being below a threshold in accordance with some embodiments.

In some embodiments the instruction flow criteria 108 indicate that the control module 106 is to assign fetch streams to the fetch and decode pipeline 112 until the workload at the pipeline 112 is at or above a minimum threshold. An example is illustrated at FIG. 4 in accordance with some embodiments. In the example of FIG. 4, the control module 106 monitors the fullness of the input queue 225 of the fetch and decode pipeline 112 and compares the fullness to a threshold 431. In the depicted example, the fullness of the input queue 225 has not reached the threshold 431. That is, the input queue 225 has fewer instruction bytes awaiting processing than the threshold 431 amount for the input queue. Accordingly, in response to receiving from the branch predictor 102 an indicator of a fetch stream 428, the control module 106 selects the fetch and decode pipeline 112 to process the fetch stream 428.

Figure 5:
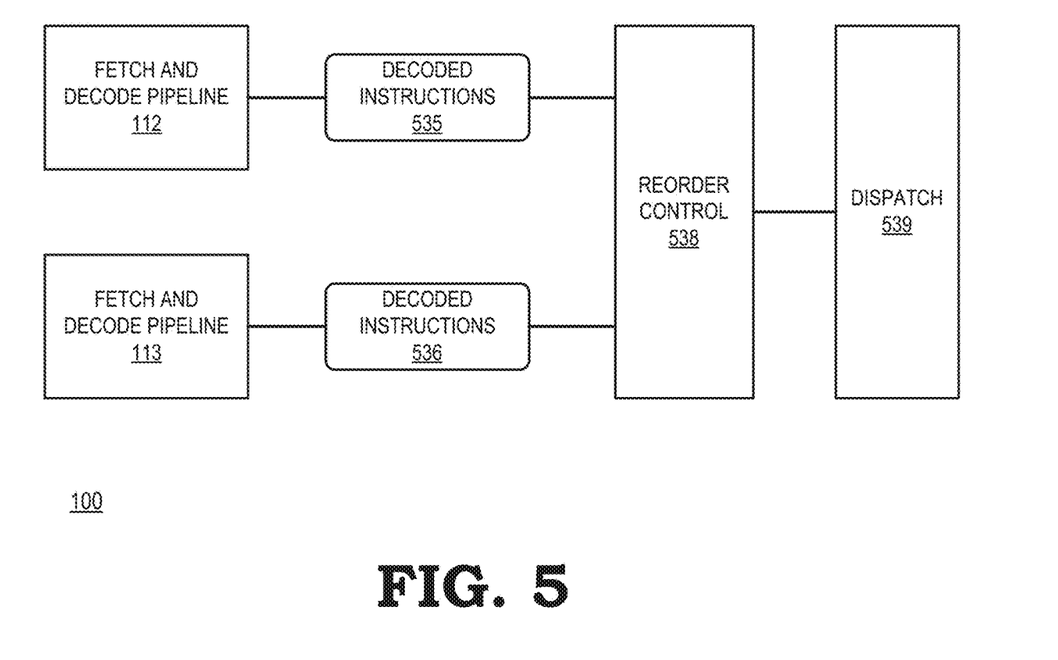
FIG. 5 is a block diagram of the processor of FIG. 1 including a reorder control module to reorder decoded instructions received from the plurality of fetch and decode pipelines in accordance with some embodiments.

In some embodiments, the control module 106 assigns fetch streams to the fetch and decode pipelines 112 and 113 such that instructions are processed out of order relative to an overall program flow associated with the instruction stream 101. In some cases, such out-of-order processing of instructions causes errors in other portions of the processor 100, such as at one or more execution units of the processor 100. Accordingly, in some embodiments the processor 100 includes elements to restore the order of instruction bytes after the fetch and decode pipelines 112 and 113. An example is illustrated at FIG. 5 in accordance with some embodiments. In the depicted example, the processor 100 includes a reorder control module 538 placed between the fetch and decode pipelines 112 and 113 and a dispatch unit 539.

In operation, the fetch and decode pipelines 112 and 113 decode fetched instruction bytes into corresponding sets of operations, depicted as decoded instructions 535 and decoded instructions 536, respectively. As noted above, in some cases the pipelines 112 and 113 generate these operations out of order relative to the overall program flow of the instruction stream 101. The reorder control module 138 is configured to reorder the operations generated by the fetch and decode pipelines 112 and 113 to restore the original order of the instruction stream 101. For example, in some embodiments, the reorder control module 138 reorders the operations so that the sequence of the reordered operations correspond to the sequence that would have resulted if the operations had been generated by a single fetch and decode pipeline. The reorder control module 138 provides the reordered operations to the dispatch unit 539, which dispatches each operation to a corresponding execution unit (not shown) of the processor 100.

In different embodiments, the reorder control module 138 includes different reordering structures. For example, in some embodiments the reorder control module includes a first-in first-out (FIFO) buffer that restores the ordering of operations received from the fetch and decode pipelines 112 and 113. In other embodiments, the reorder control module 138 includes a separate FIFO buffer for each of the fetch and decode pipelines 112 and 113, and also includes a reordering sequence FIFO buffer that stores control information such as one or more of: an instruction or block sequence number for each operation, the FIFO buffer that stores the block start operation (that is, the FIFO buffer that stores the operation corresponding to the initial instruction of a fetch window), the FIFO start entry address (that is, the address of the FIFO buffer entry that stores the operation corresponding to the initial instruction of a fetch window), the FIFO end entry address (that is, the address of the FIFO buffer entry that stores the operation corresponding to the last instruction of a fetch window), the number of entries for the fetch block in the corresponding FIFO buffer, and the like, or any combination thereof. Control circuitry of the reorder control module 138 employs this control information to restore the order of the operations stored at the separate FIFO buffers.

In other embodiments, the reorder control module 138 includes a FIFO buffer that stores the oldest, reordered set of operations at the FIFO write time, and further includes another FIFO buffer that stores other younger blocks of operations from any of the plurality of fetch and decode pipelines. The reorder control module 13 further includes a reordering sequence FIFO buffer that stores control information such as one or more of an instruction or block sequence number, the FIFO that stores the fetch window start, The FIFO entry start address, the FIFO entry end address, and the number of entries for the fetch window in the corresponding FIFO buffer. Control circuitry of the reorder control module 138 employs this control information to restore the order of the operations stored at the separate FIFO buffers.

In still other embodiments, each branch prediction window is associated with an identifier, such as a sequence number. The reorder control module 138 includes a storage structure having multiple entries, wherein an entry addressed by the branch prediction identifier stores one or more of an indicator of a set of predictions that begins with the corresponding branch prediction window, the size of the branch prediction window, and a pointer to the set of operations associated with the next branch prediction window of the instruction stream 101. In still other embodiments, the reorder control module 138 employs a linked list of descriptors that identify the correct sequence of decoded operations. The reorder control module 138 employs this sequencing information to restore the received operations to the sequence indicated by a program flow of the instruction stream 101.

Figure 6:
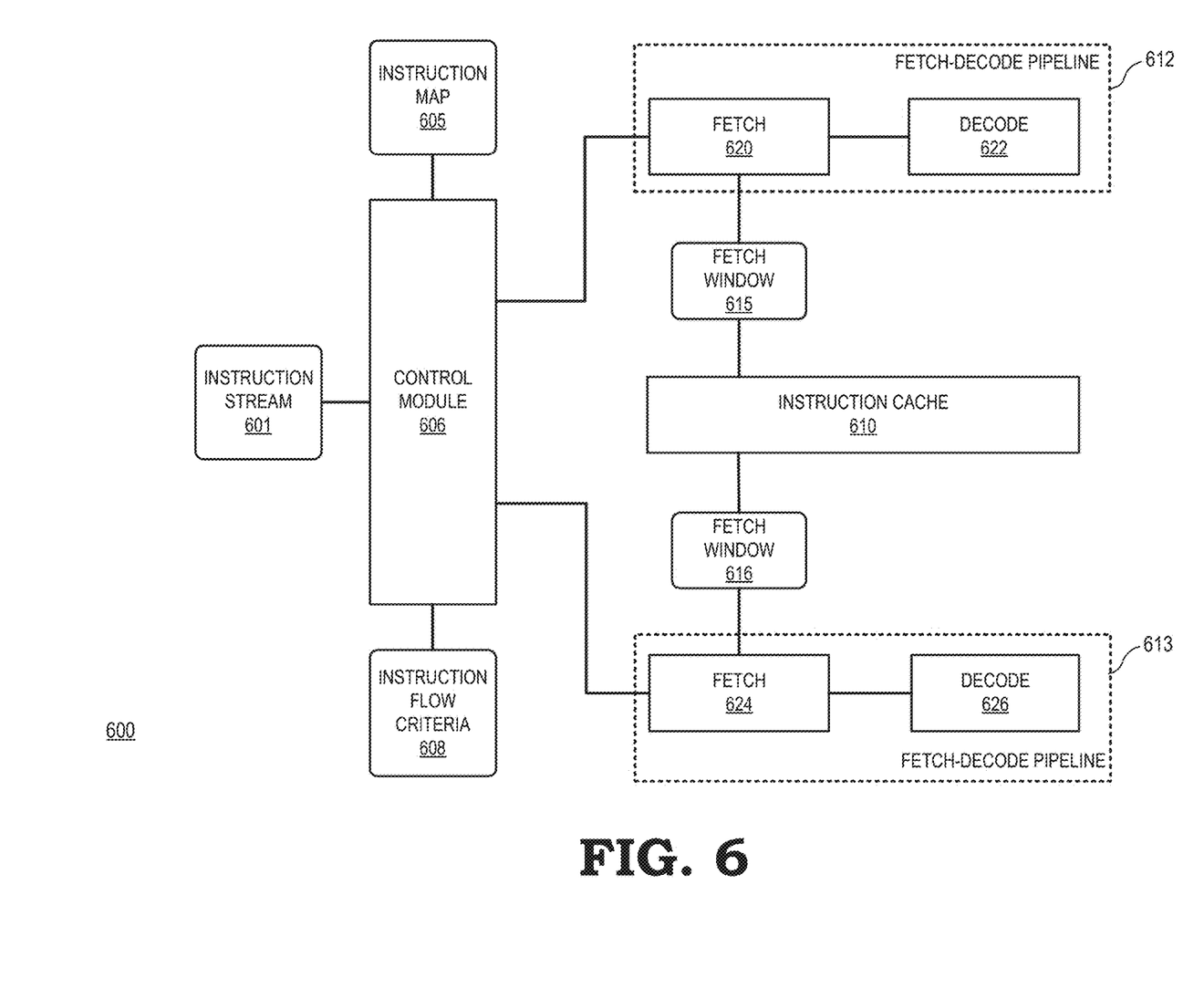
FIG. 6 is a block diagram of a processor including a plurality of fetch and decode pipelines that concurrently process blocks of instructions wherein block boundaries are indicated by a memory map in accordance with some embodiments.

In some embodiments, in addition to or instead of employing branch instructions to identify fetch streams, a processor employs other information, such as an instruction map, to identify known starting points for fetch streams. An example is illustrated at FIG. 6, which depicts a block diagram of a processor 600 in accordance with some embodiments. The processor 600 includes a fetch and decode pipeline 612 having a fetch unit 620 and a decode unit 622, a fetch and decode pipeline 614 having a fetch unit 624 and a decode unit 626, an instruction cache 610, a control module 606, and instruction flow criteria 608. Each of these elements is configured similarly to, and performs operations similar to, the correspondingly numbered elements of the processor 100. However, for the example of processor 600, the control module 606 is configured to identify fetch streams of a received instruction stream 601 based on an instruction map 605.

To illustrate, in some embodiments the instruction map 605 is a data structure stored at memory, cache, or other storage element, and that identifies the start and ending addresses of at least a subset of the instructions of the instruction stream 601. For example, in some embodiments the instruction map 605 identifies one or more target start addresses (such as an initial pointer to a code block or a redirect address to a mispredicted branch) for one or more corresponding fetch streams. In addition, in some embodiments, the instruction map 605 identifies one or more instruction endpoints. The instruction map 605 thus identifies known boundaries of variable length instructions of the instruction stream 601.

In some embodiments, the instruction map 605 is a bitmap where each bit of the bitmap maps to a byte of instruction memory map and if set, marks the end of an instruction. In other embodiments the instruction map 605 stores encoded end addresses of instructions, such as via a 6-bit field that stores a pointer to any target byte within a 64-byte cache line of the instruction cache 610, wherein the target byte identifies the end of an instruction. In some embodiments the instruction map 605 identifies the end of every instruction in the instruction stream 601, while in other embodiments the instruction map 605 identifies the end of only a subset of instructions, such as identifying the end only of instructions of specified types, such as one or more of a jump instruction, a call instruction, and a return instruction. In still other embodiments, the instruction map 605 identifies the end of only up to a specified number of instructions per cache line of the instruction cache 610.

In some embodiments, the instruction map 605 is generated during a compile process of a program associated with the instruction stream 601. In other embodiments, the instruction map 605 is generated by the control module 106 based on instruction endpoints identified by the decode units 622 and 626 during an initial execution of the instruction stream 601.

The control module 606 employs the target start addresses and instruction endpoints identified by the instruction map 605 to divide the received instruction stream 601 into different fetch streams (e.g. fetch stream 615 and 616). Each fetch stream begins with a target start address and ends with an instruction corresponding to an instruction endpoint, as denoted by the instruction map 605. Based on the instruction flow criteria 608, the control module 606 assigns each fetch stream to one of the fetch and decode pipelines 612 and 613, thereby enhancing instruction throughput at the processor 600.

It will be appreciated that FIG. 6 has been described with respect to an example implementation at a processor employing variable length instructions. However, it will be appreciated that in other embodiments the techniques described herein are applied at a processor employing fixed-length instructions. For example, in some embodiments the processor implements a fixed length instruction set that provides well-known instruction start boundaries (e.g., alignment is to a four byte boundary), so an indication of "no prediction" from a branch predictor indicates a valid start point for fetching and decoding for those instruction sets (because the "no prediction" boundary is also aligned to the well-known instruction start boundary).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   selecting, based on a first branch prediction from a branch predictor and on one or more defined selection policies, a first fetch and decode pipeline from a plurality of fetch and decode pipelines;
   selecting, based on a second branch prediction from the branch predictor and on the one or more defined selection policies, a second fetch and decode pipeline from the plurality of fetch and decode pipelines; and
   providing instructions of a first fetch stream to the first fetch and decode pipeline and instructions of a second fetch stream to the second fetch and decode pipeline.

2. The method of claim 1, wherein the one or more defined selection policies indicate a fullness of a first queue of a processor that supplies instructions to the first fetch and decode pipeline.

3. The method of claim 2, wherein the one or more defined selection policies indicate a fullness of a second queue of a processor that supplies instructions to the second fetch and decode pipeline.

4. The method of claim 1, wherein the one or more defined selection policies indicate a number of fetch streams provided to the first fetch and decode pipeline prior to the selecting.

5. The method of claim 4, wherein the one or more defined selection policies indicate a minimum number of fetch streams expected to be provided to each of the plurality of fetch and decode pipelines.

6. The method of claim 4, wherein the one or more defined selection policies indicate a maximum number of fetch streams expected to be provided to each of the plurality of fetch and decode pipelines.

7. The method of claim 1, wherein selecting the first fetch and decode pipeline is further based on a quality of service identifier for a program thread associated with the first branch prediction.

8. The method of claim 1, further comprising:
   generating a plurality of decoded instructions at the plurality of fetch and decode pipelines based on a plurality of branch predictions of the branch predictor that includes the first branch prediction; and
   reordering the plurality of decoded instructions after the plurality of decoded instructions are generated, the reordering based on an identified program sequence.

9. The method of claim 1, further comprising fetching and decoding the instructions of the second fetch stream concurrently with fetching and decoding instructions of the first fetch stream at the first fetch and decode pipeline.

10. A method comprising:
    identifying a fetch stream based on an instruction map identifying an address of a start of the fetch stream and an address of an end of the fetch stream;
    selecting a first fetch and decode pipeline from a plurality of fetch and decode pipelines based at least in part on a first branch prediction of multiple branch predictions generated for the plurality of fetch and decode pipelines by a branch predictor; and
    fetching and decoding instructions of the first fetch stream at the selected first fetch and decode pipeline.

11. The method of claim 10, further comprising:
    identifying a second fetch stream based on the end of the first fetch stream and based on the instruction map;
    selecting a second fetch and decode pipeline of the plurality of fetch and decode pipelines; and
    fetching and decoding instructions of the second fetch stream at the selected second fetch and decode pipeline.

12. A processor comprising:
    a plurality of fetch and decode pipelines;
    a branch predictor to generate branch predictions for the plurality of fetch and decode pipelines; and
    a control module to select a first fetch and decode pipeline of the plurality of fetch and decode pipelines based on a first branch prediction of the generated branch predictions and on one or more defined selection policies;
    wherein the selected first fetch and decode pipeline is to fetch and decode instructions of a first fetch stream associated with the first branch prediction.

13. The processor of claim 12, wherein the one or more defined selection policies indicate a fullness of a first queue of the processor, the first queue associated with the first fetch and decode pipeline.

14. The processor of claim 13, wherein the one or more defined selection policies indicate a fullness of a second queue of the processor, the second queue associated with a second fetch and decode pipeline of the plurality of fetch and decode pipelines.

15. The processor of claim 12, wherein the one or more defined selection policies indicate a number of fetch streams provided to the first fetch and decode pipeline prior to the selecting.

16. The processor of claim 15, wherein the one or more defined selection policies indicate a minimum number of fetch streams expected to be provided to each of the plurality of fetch and decode pipelines.

17. The processor of claim 15, wherein the one or more defined selection policies indicate a maximum number of fetch streams expected to be provided to each of the plurality of fetch and decode pipelines.

18. The processor of claim 12, wherein the control module is to select the first fetch and decode pipeline based further on a quality of service identifier for a program thread associated with the first branch prediction.

19. The processor of claim 12, wherein at least one selection policy of the defined selection policies is generated by an operating system executing at the processor.

20. The processor of claim 12, wherein the at least one selection policy of the one or more selection policies is adjustable by a user of the processor.

\* \* \* \* \*